United States Patent
Howard

(10) Patent No.: US 7,357,601 B2
(45) Date of Patent: Apr. 15, 2008

(54) ADAPTIVE COUPLING AND METHOD

(75) Inventor: James R. Howard, Blairsville, PA (US)

(73) Assignee: TFH Holdings, LLC, Plymouth Meeting, PA (US)

( * ) Notice: Subject to any disclaimer, the term of this patent is extended or adjusted under 35 U.S.C. 154(b) by 0 days.

(21) Appl. No.: 11/271,276

(22) Filed: Nov. 10, 2005

(65) Prior Publication Data

US 2007/0104540 A1    May 10, 2007

(51) Int. Cl.
*B09C 1/00* (2006.01)
(52) U.S. Cl. .............................. 405/129.5; 405/129.85; 405/129.95; 405/129.7
(58) Field of Classification Search ........... 405/129.95, 405/129.9, 129.85, 129.75, 129.7, 129.65, 405/129.57, 129.5, 129.45, 129.15, 129.1
See application file for complete search history.

(56) References Cited

U.S. PATENT DOCUMENTS

| | | | |
|---|---|---|---|
| 4,483,396 A | 11/1984 | Kennelly | |
| 4,838,733 A * | 6/1989 | Katz | 405/129.15 |
| 5,120,161 A * | 6/1992 | Faussone | 405/129.6 |
| 5,211,428 A | 5/1993 | Emerson et al. | |
| 6,213,685 B1 | 4/2001 | Ingalls | |

\* cited by examiner

*Primary Examiner*—Frederick L. Lagman
(74) *Attorney, Agent, or Firm*—Panitch Schwarze Belisario & Nadel LLP

(57) ABSTRACT

An adaptive coupling and method for joining a conduit to a barrier sheet through which the conduit passes are disclosed. The barrier sheet is movable axially relative to the conduit. A tubular member and an extensible boot are configured to allow passage of a portion of the conduit through an entirety of each. The tubular member is sealably joinable to the sheet and is sealedly joined to the extensible boot such that the first end of the extensible boot is movable in unison with the tubular member. The second end of the extensible boot is sealably and fixably joinable to the conduit such that the first end of the extensible boot is movable axially relative to the second end of the extensible boot when the tubular member moves axially. A substantially leakless seal is formed between the barrier sheet and the conduit.

12 Claims, 5 Drawing Sheets

ADAPTIVE COUPLING AND METHOD

BACKGROUND OF THE INVENTION

The present invention relates to an adaptive coupling and an adaptive coupling method for joining a conduit to a barrier sheet through which the conduit passes and which is movable axially relative to the conduit. More particularly, the present invention relates to an adaptive coupling and method for use in gas recovery systems for landfill gas emissions wherein a substantially leakless seal is desired between a flexible barrier sheet covering a landfill and a gas recovery conduit extending through the barrier sheet into a landfill gas well or a monitoring conduit extending through the barrier sheet into a landfill monitoring well.

In a conventional landfill, the waste material is covered by a flexible barrier sheet or cap that is substantially gas impermeable. As the waste below the cap decomposes, landfill gases including methane and carbon dioxide are produced. The methane may create a risk of explosion if entrapped in an enclosed space under the landfill cap or if the gas migrates through subsurface formations to enclosed structures near the landfill.

The risk of explosion typically is mitigated by passive systems for venting and flaring the gas or by active gas recovery systems. Landfills with active gas recovery systems generally have monitoring wells and gas recovery wells strategically positioned near the perimeter of the landfill and also may have such wells throughout the landfill. A network of header pipes connect the wells to a pumping facility designed to remove the gas under vacuum from the landfill.

The typical gas recovery well has a vertical bore approximately two to three feet in diameter extending to a substantial depth in the landfill. Well depths ranging from approximately fifty percent to ninety percent of the depth of the landfill are typical and may be less than twenty-five feet in depth to more than one-hundred feet in depth. A gas recovery riser (or conduit) extends from the bottom of the well to the header pipes. Before reaching the header pipes, the gas recovery conduit typically passes through several feet of intermediate cover over the landfill waste material, a barrier sheet (or cap) over the immediate cover, and several feet of protective soil over the cap. Even though an active gas recovery system may be in place, a significant amount of landfill gas may be lost to the atmosphere. The loss may be attributable, in part, to leakage that occurs between the barrier sheet and the gas recovery conduit extending through the barrier sheet as the barrier sheet moves axially relative to the conduit due to the subsidence of the landfill material.

Accordingly, there is a need in the art for a coupling able to accommodate landfill subsidence while maintaining a substantially leakless seal between a barrier sheet and a gas recovery conduit.

BRIEF SUMMARY OF THE INVENTION

Briefly stated, one embodiment of the present invention is directed to an adaptive coupling for joining a conduit to a barrier sheet through which the conduit passes. The barrier sheet is movable axially relative to the conduit. The adaptive coupling comprises a tubular member configured to allow passage of the conduit through an entirety of the tubular member. The tubular member has a first end and a second end. The first end has a base configured to sealably join the tubular member to the sheet. An extensible boot is configured to allow passage of the conduit through an entirety of the extensible boot. The extensible boot has a first end and a second end. The first end is sealably joined to the second end of the tubular member such that the first end of the extensible boot is movable in unison with the tubular member. The second end is sealably and fixably joinable to the conduit such that the first end of the extensible boot is movable axially relative to the second end of the extensible boot when the second end of the extensible boot is sealedly and fixedly joined to the conduit and the tubular member moves axially. A substantially leakless seal is formed between the barrier sheet and the conduit when the base of the tubular member is sealedly joined to the sheet and the second end of the extensible boot is sealedly and fixedly joined to the conduit.

Another embodiment of the present invention is directed to an adaptive method for monitoring and controlling the extraction of fluid by a fluid collection system from a landfill having a barrier sheet and a fluid well with a bore. The method comprises the steps of: providing an adaptive coupling having a tubular member and an extensible boot, the tubular member having a first end and a second end, the extendible boot having a first end and a second end, the first end of the extendible boot sealably joined to the second end of the tubular member such that the first end of the extensible boot is movable in unison with the tubular member; forming a substantially leakless first seal by joining the first end of the tubular member to the barrier sheet; passing a conduit through the entirety of the adaptive coupling and through the barrier sheet such that the barrier sheet is movable axially relative to the conduit, a first end of the conduit is in the bore of the fluid well in the landfill, and the second end of the conduit accessibly extends from the adaptive coupling; forming a substantially leakless repositionable second seal by fixedly repositionably joining the second end of the extensible boot of the adaptive coupling to the conduit such that the first end of the extensible boot is movable axially relative to the second end of the extensible boot when the tubular member moves axially; connecting by a well head the second end of the conduit to the fluid collection system; monitoring a pressure of the fluid in the landfill based on a radial displacement of the extensible boot; and controlling extraction of the fluid from the landfill by adjusting a vacuum in the well head caused by the fluid collection system.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
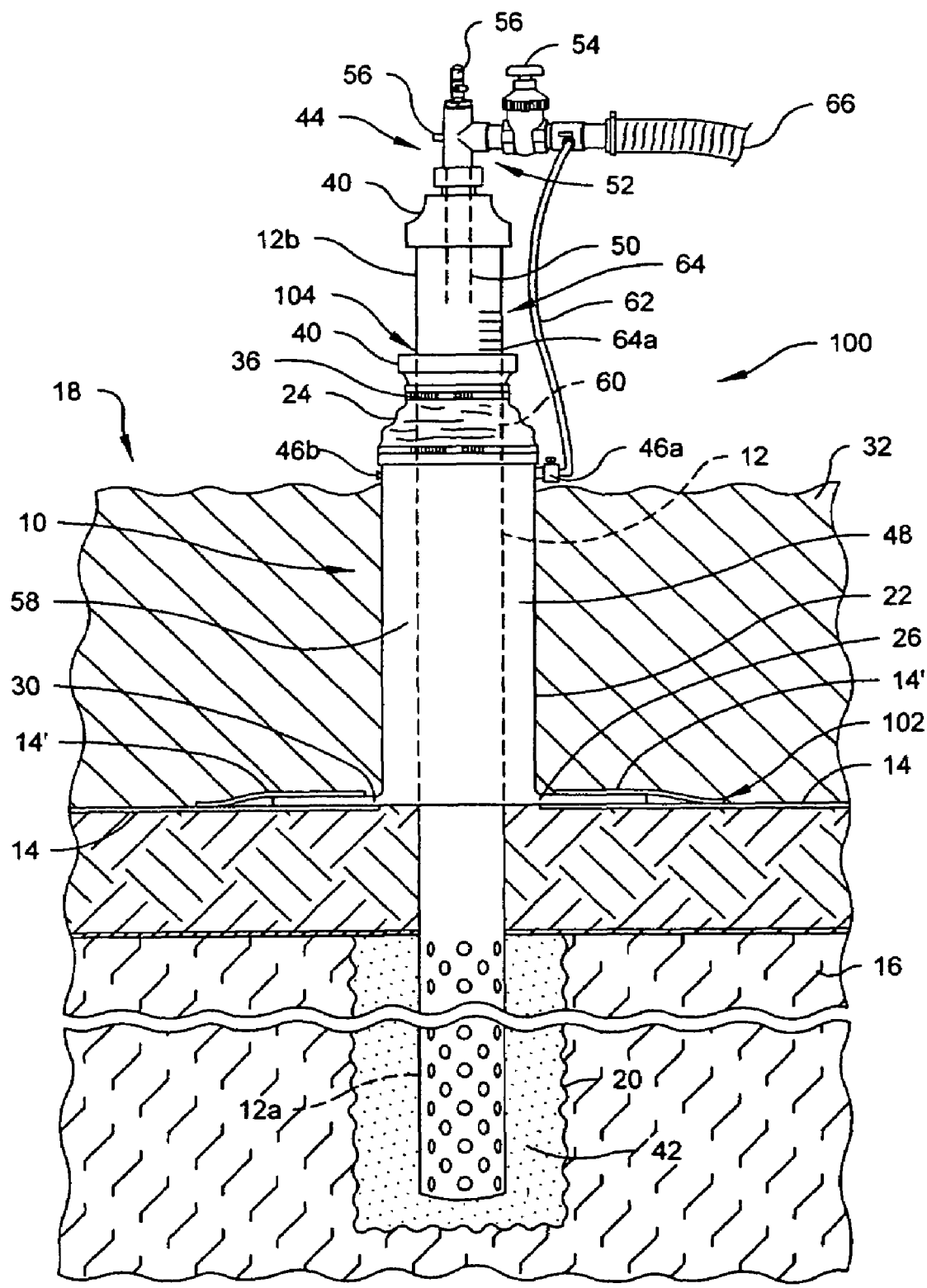
FIG. 1 is a vertical cross-sectional view of a preferred embodiment of the adaptive coupling in accordance with the present invention in combination with a flexible barrier sheet covering a landfill and a gas recovery conduit extending through the barrier sheet into a landfill gas well.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the adaptive coupling, and designated parts thereof. The terminology includes the words noted above, derivatives thereof, and words of similar import. Additionally, as used in the claims and the corresponding portions of the specification, the words "sealably joinable", derivatives thereof, and words of similar import, mean there is formable between any two or more elements a substantially leakless structural path, which may include additional elements not explicitly recited.

Figure 2:
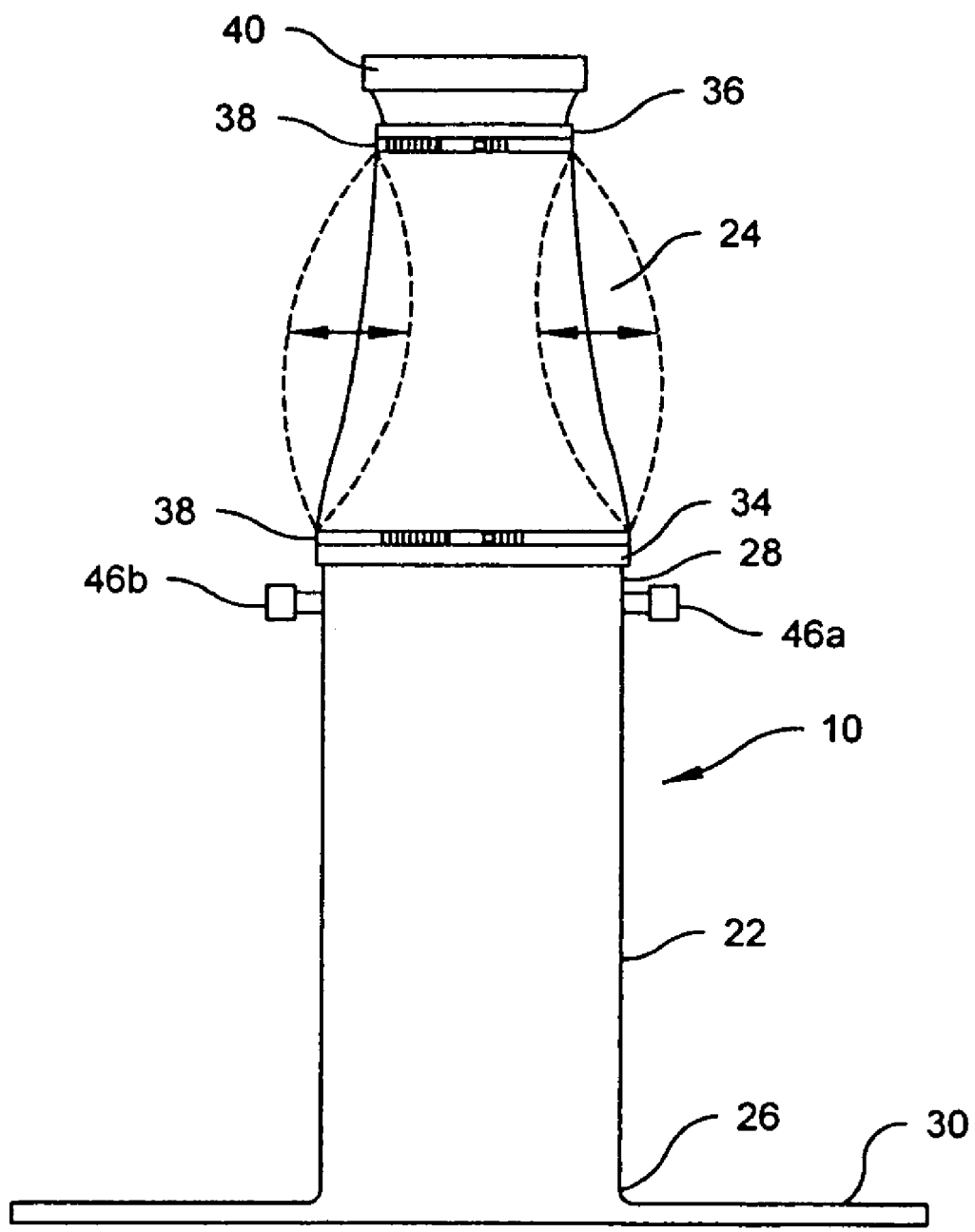
FIG. 2 is a side elevation view of the adaptive coupling of FIG. 1.

Referring to the drawings in detail, where like numerals indicate like elements throughout, there is shown in FIGS. 1-2 a first preferred embodiment of the adaptive coupling, generally designated 10, and hereinafter referred to as the "adaptive coupling" 10 in accordance with the present invention. The adaptive coupling 10 is for joining a conduit 12 to a barrier sheet 14 through which the conduit 12 passes and which is movable axially relative to the conduit 12. The adaptive coupling 10 may be configured for use in a wide variety of applications, examples of which are further discussed below, and may be fabricated from any of a variety of materials chosen to accommodate a wide variety of environments.

A preferred application for the adaptive coupling 10 is for joining a barrier sheet 14 covering waste material 16 in a landfill 18 to the gas recovery conduit 12 extending from the gas recover well 20 in the landfill 18 such that a substantially leakless, seal is formed between the barrier sheet 14 and the conduit 12. Accordingly, a preferred embodiment of the adaptive coupling 10 is disclosed with reference to a landfill application. However, the example is not intended to be limiting. The adaptive coupling 10 is also suitable for use in applications in which a geosynthetic membrane covering potentially subsiding material is joined to a conduit passing through the membrane.

Referring to FIG. 2, the adaptive coupling 10 comprises a tubular member 22 and an extensible boot 24. The tubular member 22 is configured to allow passage of the conduit 12 through an entirety of the tubular member 22. The tubular member 22 has a first end 26 and a second end 28. The first end 26 has a base 30 configured to sealably join the tubular member 22 to the sheet 14. The second end 28 of the tubular member 22 is sealedly joined to the extensible boot 24 as disclosed below.

In a typical landfill application, the tubular member 22 has a length sufficient to extend from the barrier sheet 14 covering the landfill waste material 16 through the entirety of the protective soil 32. As the protective soil 32 is usually about two foot in depth, the tubular member 22 may be approximately two and one-half to three foot in length. However, the length of the tubular member 22 may be shorter or longer than this range without departing from the spirit of the invention. The tubular member 22 of choice may be a high density polyethylene pipe having a standard dimension ration of approximately seventeen. High density polyethylene pipe having a wide range of standard dimension rations also may be used. Alternatively, the tubular member 22 may be a polymeric material other than high density polyethylene. As the gas recovery conduit 12 extending from a gas recovery well 20 is usually approximately six inch in diameter, the outside diameter of the tubular member 22 may be approximately ten to eleven inch and the wall thickness of the tubular member 22 may be approximately one-half to three-quarter inch. Those skilled in the art will understand that the aforementioned dimensions and material of the tubular member 22 are not limiting and may be varied to correspond to the requirements of the application.

The base 30 of the tubular member 22 may be formed in unison with the first end 26 of the tubular member 22 and extend radially outwardly therefrom. Alternatively, the base 30 may be a plate formed separately from the tubular member 22 and affixed, such as by welding, to the first end 26. Although preferably disk like or rectangular in shape, the base 30 may have any geometric shape. The base 30 may be weldable directly to the sheet 14 to sealedly join the base 30 to the sheet 14. Alternatively, the base 30 may be sealedly joinable to the sheet 14 by other well known methods such as adhesive bonding. The sheet 14 may be joined to the top surface of the base 30 or the bottom surface of the base 30 depending on whether the sheet 14 is in place before or after the base 30 is positioned adjacent the sheet 14 for joining. Alternatively, as shown in FIG. 1, if the barrier sheet 14 is in place, a liner (or second sheet) 14' may be joined to the top surface of the base 30 and also to the sheet 14.

The extensible boot 24 is a deformable tubular structure configured to allow passage of the conduit 12 through an entirety of the extensible boot 24. The extensible boot 24 may be fabricated from a polymeric membrane material such as polyvinyl chloride or any other generally gas impermeable material having material properties allowing the extensible boot 24 to extend axially from a compressed configuration (FIG. 1) to an extended configuration (FIG. 2) and to be radially inwardly and outwardly displaceable as shown in phantom in FIG. 2 when a differential pressure acts on the extensible boot 24. The extensible boot 24 has a first end 34 and a second end 36. The first end 34 of the extensible boot 24 is sealedly joined to the second end 28 of the tubular member 22 such that the first end 34 of the extensible boot 24 is movable in unison with the tubular member 22.

A variety of well known methods may be used to sealedly join the second end 28 of the tubular member 22 to the first end 34 of the extensible boot 24. For example, the second end 28 of the tubular member 22 may be inserted in the first end 34 of the extensible boot and sealed by welding. Alternatively, and preferably, the first end 34 of the extensible boot 24 may be sealedly joined to the second end 28 of the tubular member 22 by a removable fastener 38, such as compression band or hose clamp. Prior to joining the first end 34 of the extensible boot 24 to the second end 28 of the tubular member 22 with the removable fastener, a sealant, such as butyl rubber, may be applied between the tubular member 22 and the extensible boot 24 to form a substabtially leakless seal.

The second end 36 of the extensible boot 24 is sealably and fixably joinable to the conduit 12 such that the first end 34 of the extensible boot 24 is movable axially relative to the second end 36 of the extensible boot 24 when the second end 36 of the extensible boot 24 is sealedly and fixedly joined to the conduit 12 and the tubular member 22 moves axially. Preferably, the second end 36 of the extensible boot 24 is sealably and fixably joinable to the conduit 12 by a compression coupler 40 sealedly and fixedly joined to the second end 36 of the extensible boot 24 in substantially the same manner as the second end 28 of the tubular member 22 is joined to the first end 34 of the extensible boot 24. The second end 36 of the extensible boot 24 may be sealably and fixably repositionably joinable to the conduit 12 to allow for repositioning of the location the second end 36 is fixedly attached to the conduit 12 before the axial extension of the extensible boot 24 exceeds the elastic limit of the material from which the extensible boot 24 is fabricated.

A substantially leakless seal is formed between the barrier sheet 14 and the conduit 12 when the base 30 of the tubular member 22 is sealedly joined to the sheet 14 and the second end 36 of the extensible boot 24 is sealedly and fixedly joined to the conduit 12.

In another embodiment of the present invention, the adaptive coupling 10 is in combination with the barrier sheet 14 and the conduit 12. The combination is generally designated 100, and is hereinafter referred to as the "adaptively coupled combination" 100 in accordance with the present invention. The features of the adaptive coupling 10 of the adaptively coupled combination 100 are described above and for brevity are not repeated here. The adaptive coupling 10 of the adaptively coupled combination 100 joins the conduit 12 to the barrier sheet 14 through which the conduit 12 passes and forms a substantially leakless seal between the barrier sheet 14 and the conduit 12 as subsequently described.

A first portion 58 of the conduit 12 passes through the entirety of the tubular member 22, and a second portion 60 of the conduit 12 passes through the entirety of the expansible boot 24. The base 30 of the tubular member 22 sealedly joins the tubular member 22 to the barrier sheet 14. The second end 36 of the extensible boot 24 is sealedly and fixedly joined to the conduit 12. Preferably, the second end 36 of the extensible boot 24 is sealedly and fixedly repositionably joined to the conduit 12 to provide the capability for repositioning of the location the second end 36 is fixedly attached to the conduit 12. The conduit 12 may have a scale 64 identifying where along a length of the conduit 12 the second end 36 of the extensible boot 24 sealedly and fixedly repositionably is joined to the conduit 12.

Figure 3:
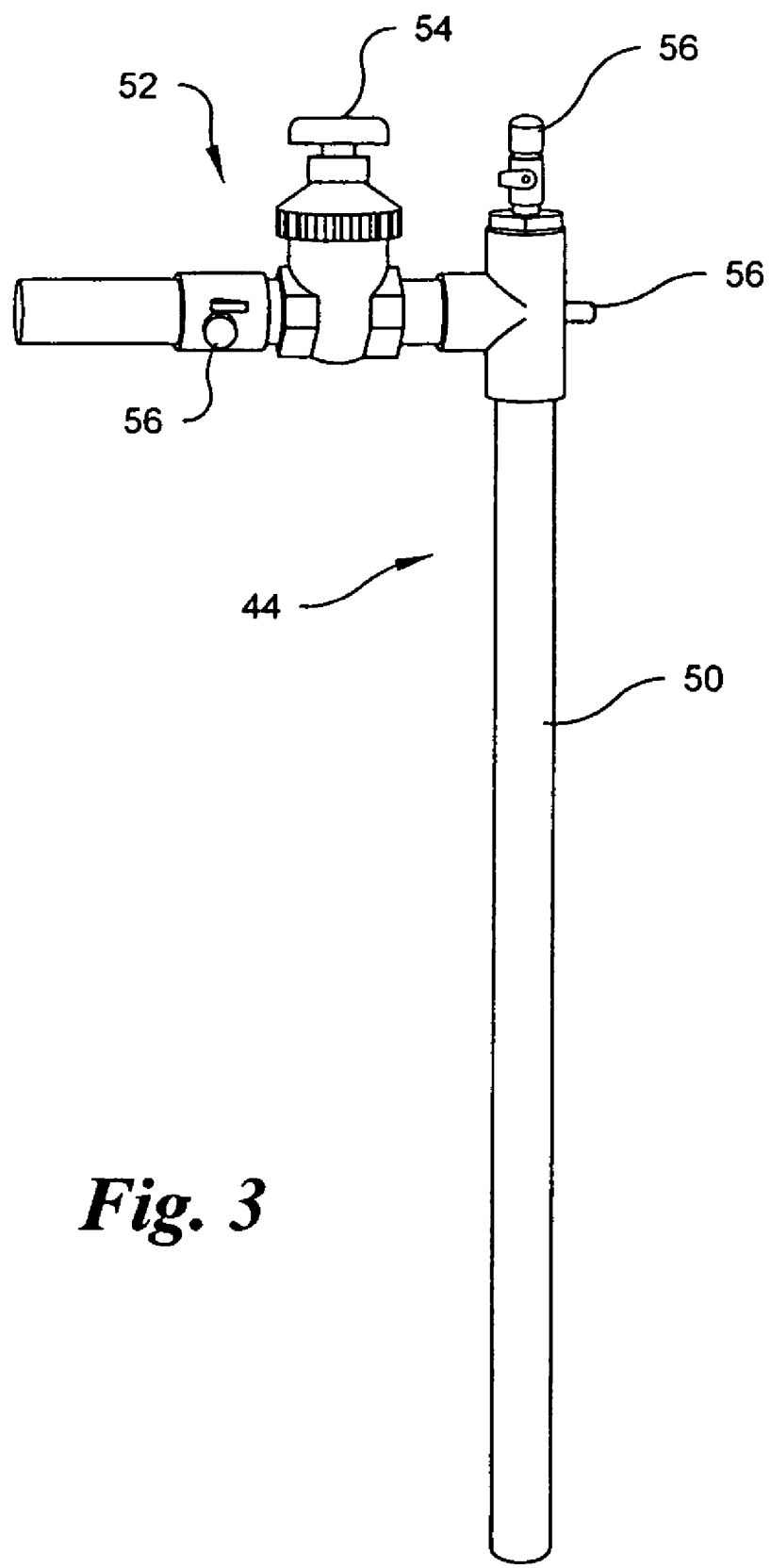
FIG. 3 is a side elevation view of the well head of FIG. 1.

In a preferred application, the barrier sheet 14 may be a cap liner of a landfill, such as the landfill 18 (FIG. 1). As shown in FIG. 1, the conduit 12 has a lower portion 12a in the bore 42 of the gas recovery well 20 and an upper portion 12b that extends above the well 20 and has a well head 44 configured as shown in FIG. 3 to interface with a gas collection system (not shown) having a fed pipe 66. The tubular member 22 may have an access port 46a, 46b in fluid communication with an annular space 48 between the tubular member 22 and the conduit 12. The access port 46a may be configured to enable extraction of a fluid in the annular space 48. The access port 46b may be configured to operatively couple with an analyzer (not shown), such as a chromatograph, thermal probe, or pressure gauge, for monitoring a property of a fluid in the annular space 48.

In a landfill application, where the barrier sheet 14 corresponds to a cap liner of a landfill, the conduit 12 may have a lower portion 12a in a bore 42 of a gas well 20 or monitoring well and an upper portion 12b configured for coupling with a well head 44. In such an application, the access port 46a may be in fluid communication with the well head 44 and by the annular space 48 in communication with a fluid, if any, collecting under the barrier sheet 14, thereby allowing the fluid to be extracted. Further, the access port 46b may be configured to allow monitoring for the presence of landfill gas entrapped by the barrier sheet 14 or a specific property of the gas.

Referring to FIG. 3, the well head 44 has a riser 50 in fluid communication with manifold piping 52 connectable to a gas collection system (not shown). The riser 50 that may be inserted in the conduit 12 and sealably joined to the conduit 12 by a compression coupler 40 allowing adjustment in the length of the riser 50 extending above the upper portion 12b of the conduit 12. The manifold piping 52 includes a shut off valve 54 and bleed valves 56 to regulate the vacuum pumping the landfill gas from the gas recovery well 20.

Figure 4:
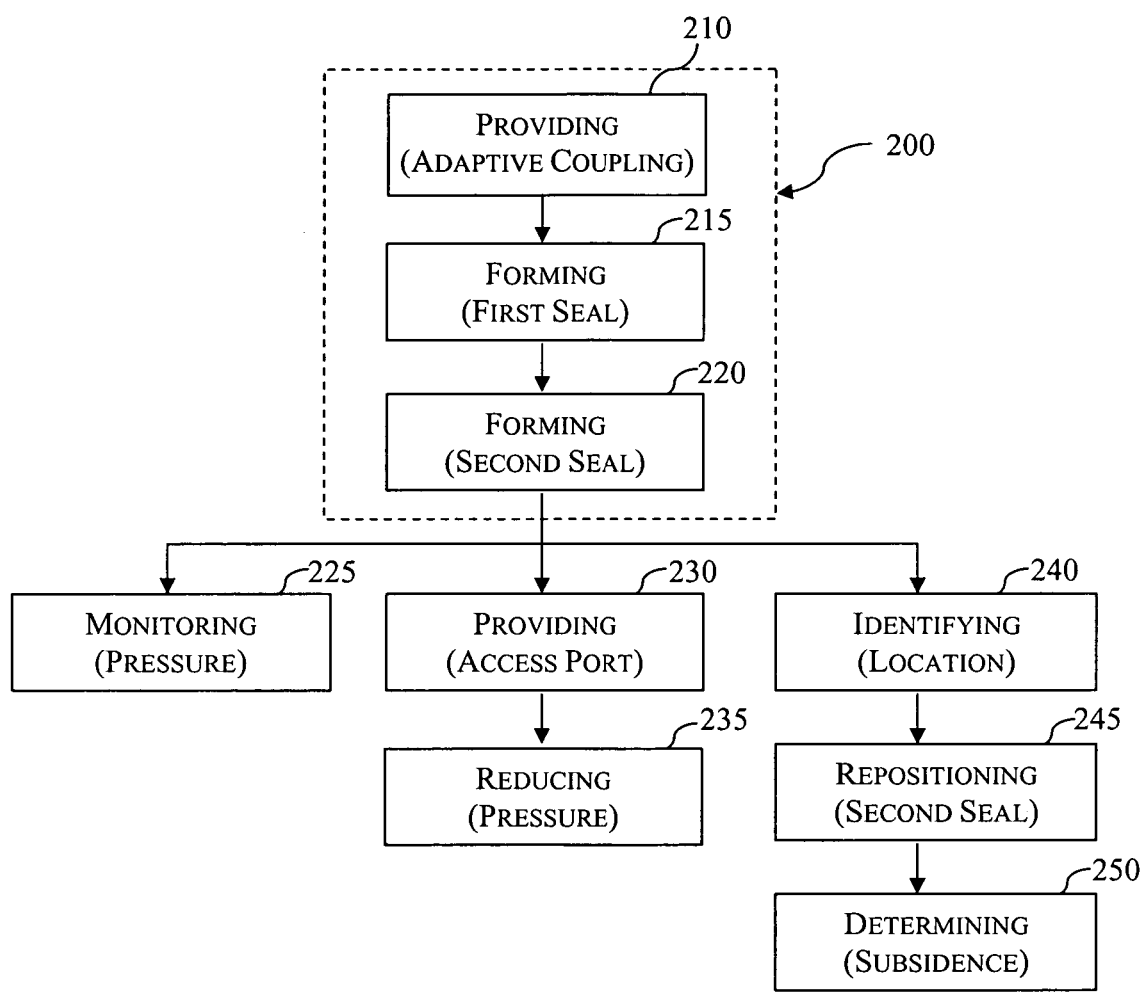
FIG. 4 is a schematic diagram of a preferred method for adaptively coupling the conduit of FIG. 1 to the barrier sheet of FIG. 1 in accordance with the present invention.

Referring to FIG. 4, there is shown a preferred method, hereafter referred to as the "adaptive coupling method" 200, for joining a conduit to a barrier sheet through which the conduit passes such that the barrier sheet is movable axially relative to the conduit. The preferred embodiment of the adaptive coupling method 200 is disclosed with reference to the landfill application shown in FIG. 1. However, the example is not intended to be limiting. The adaptive coupling method 200 may be practiced in any application in which a geosynthetic membrane covering potentially subsiding material is joined to a conduit passing through the membrane.

The adaptive coupling method 200 uses an embodiment of the present invention, such as the adaptive coupling 10 (FIG. 2) in combination with a barrier sheet 14 and a conduit 12 to form an adaptively coupled combination 100 having a first seal 102 and a second seal 104. The adaptively coupled combination 100 is shown in FIG. 1 for a landfill application having an existing gas recovery well 20. As shown in FIG. 1, the conduit 12 has a lower portion 12a fixedly positioned in the bore 42 of the gas recovery well 20 and an upper portion 12b that extends above the protective cover 32. In preparation for forming the adaptively coupled combination 100, if the barrier sheet 14 covering the landfill waste material 16 is not exposed, access to the barrier sheet 14 is provided by removing a portion of the protective cover 32.

After the barrier sheet 14 adjacent the conduit 12 is exposed, providing the adaptive coupling, step 210 of the adaptive coupling method 200, provides for placing the adaptive coupling 10 (FIG. 2) over the conduit 12 such that the first portion 58 of the conduit 12 passes entirely through the tubular member 22, the second portion 60 of the conduit 12 passes entirely through the extensible boot 24, and the first end 26 of the tubular member 22 is supported by the barrier sheet 14 through which the conduit 12 passes.

Forming a first seal, step 215 of the adaptive coupling method 200, provides for forming the substantially leakless first seal 102 by joining the first end 26 of the tubular member 22 to the sheet 14 such that the tubular member 22 is movable in unison with axial movement of the sheet 14. The first end 26 of the tubular member may be joined to the sheet 14 by welding the first end 26 directly to the sheet 14. To increase the surface area of the first end 26 to be welded to the sheet 14, prior to the first placing step 215, the tubular member may be provided with a radially outwardly extending base 30 formed in unison with the first end 26 of the tubular member. Alternatively, the base may be formed separately from the tubular member 22 and affixed to the first end 26 by welding. The base 30 may be weldable directly to the sheet 14 to sealedly join the base 30 to the sheet 14. The welding may join the bottom surface of the base 30 to the sheet 14. Alternatively, as shown in FIG. 1, a liner (or second sheet) 14' may be joined to the top surface of the base 30 and also to the sheet 14. Alternatively, the base 30 may be sealedly joined to the sheet 14 by other well known methods such as adhesive bonding.

Forming a second seal, step 220 of the adaptive coupling method 200, provides for forming the second substantially leakless seal 104 by joining the second end 36 of the extensible boot 24 to the conduit 12 such that the first end 34 of the extensible boot 24 is movable axially relative to the second end 36 of the extensible boot 24 when the tubular member 22 moves axially. In the second forming step 220, prior to joining the second end 36 of the extensible boot 24 to the conduit 12, the extensible boot 24 is compressed from an extended configuration (FIG. 2) to a compressed configuration (FIG. 1) to allow for extension of the extensible boot 24 as the barrier sheet 14 to which the tubular member 22 is sealedly joined moves axially relative to the conduit 12 due to subsidence of the landfill waste material 16 and also to allow for radial displacement of the extensible boot 24 when a differential pressure acts on the extensible boot 24. The second end 36 of the extensible boot 24 may be sealedly and fixedly joined to the conduit 12 by directly welding or adhesively bonding the second end 36 to the conduit 12. Alternatively, and preferably, the second end 36 of the extensible boot 24 may be sealedly and fixedly repositionably joined to the conduit 12 by the compression coupler 40 such that the second end 36 of the extensible boot 24 may be repositioned along the conduit 12 before the extension of the extensible boot 24 caused by the axial movement of the barrier sheet 14 due to subsidence of the landfill waste material 16 exceeds the elastic limit of the material from which the extensible boot 24 is fabricated.

In a preferred embodiment, the adaptive coupling method 200 may further comprise a monitoring step 225 to provide a method for monitoring a pressure of a gas acting on the barrier sheet 14, such as entrapped gas under a cap liner of a landfill. After completion of the adaptive coupling method 200 in which a substantially leakless seal is formed between the barrier sheet 14 and the conduit 12, the annular space 48 formed between the expandable boot 24 and the conduit 12 may be in fluid communication with gas collecting under the barrier sheet 14. The monitoring step 225 provides for monitoring the change in the pressure of the gas based on a radial displacement of the extensible boot 24. For example, an increase or decrease in the pressure of the entrapped gas may cause the expandable boot 24 to be displaced radially outwardly or inwardly, respectively. Accordingly, the radial displacement of the expandable boot 24 permits visual monitoring of the gas pressure under the barrier sheet 14.

In another preferred embodiment, the adaptive coupling method 200 may further comprise a providing an access port step 230 and a reducing the pressure step 235 to provide a method for controlling the pressure of a gas under the cap liner of the landfill. As discussed above, in adaptive coupling method 200 an annular space 48 formed between the expandable boot 24 and the conduit 12 may be in fluid communication with gas, if any, collecting under the barrier sheet 14. In the providing an access port step 230, the adaptive coupling 10 is provided with an access port 46a in fluid communication with the annular space 48 and thereby with the gas under the barrier sheet 14. The access port 46a may be formed by any well known method for penetrating the side of the adaptive coupling 10, such as drilling or piercing, followed by connecting any of a wide variety of valved nipples to the adaptive coupling 10 at the penetration point. Preferably, the penetration is in the tubular member 22. The reducing step 235 provides for reducing the pressure of the gas by extracting the gas using the access port 46a. Preferably, the access port 46a is in fluid communication with a gas collection system (not shown) and the gas is extracted through the access port 46a by a vacuum generated by the gas collection system. Alternatively, the gas may be vented to the atmosphere in locations where environmental regulations permit.

In another preferred embodiment, the adaptive coupling method 200 may further comprise an identifying step 240, a repositioning step 245 and a determining step 250 to provide a method for monitoring subsidence of a landfill having a cap liner. As discussed above, in the adaptive coupling method 200, the substantially leakless first seal 102 is formed by joining the first end 26 of the tubular member 22 to the sheet 14 such that the tubular member 22 is movable in unison with axial movement of the sheet 14 and the second substantially leakless seal 104 is formed by joining the second end 36 of the extensible boot 24 to the conduit 12 such that the first end 34 of the extensible boot 24 is movable axially relative to the second end 36 of the extensible boot 24 when the tubular member 22 moves axially.

In the identifying step 240, the location of the second seal 104 is identified by making a mark 64a on the conduit 12 in register with the second seal 104 or by noting the mark 64a in register with the second seal 104 if the conduit has a scale 64.

As the barrier sheet 14 moves axially relative to the conduit 12 due to subsidence of the landfill, the extensible boot 24 axially extends from a compressed configuration to an extended configuration. In the repositioning step 245, the position of the second seal 104 is repositioned along the length of the conduit 12 to return the extensible boot 24 to the original compressed configuration before the axial extension of the extensible boot 24 exceeds the elastic limit of the material from which the extensible boot 24 is fabricated. The manner in which the second seal is 104 is repositioned depends on the manner in which the seal is formed. For example, if the second seal 104 is formed by a compression coupling the repositioning may be achieved by manually releasing the compression and sliding the coupling along the conduit 12.

In the determining step 245, the distance between the mark 64a and the repositioned second seal 104 is measured to determine the subsidence of the landfill relative to the initial position of the second seal 104. Repeating the identifying, repositioning, and determining steps 240, 245, 250 over time provides a log of the subsidence of the landfill.

Figure 5:
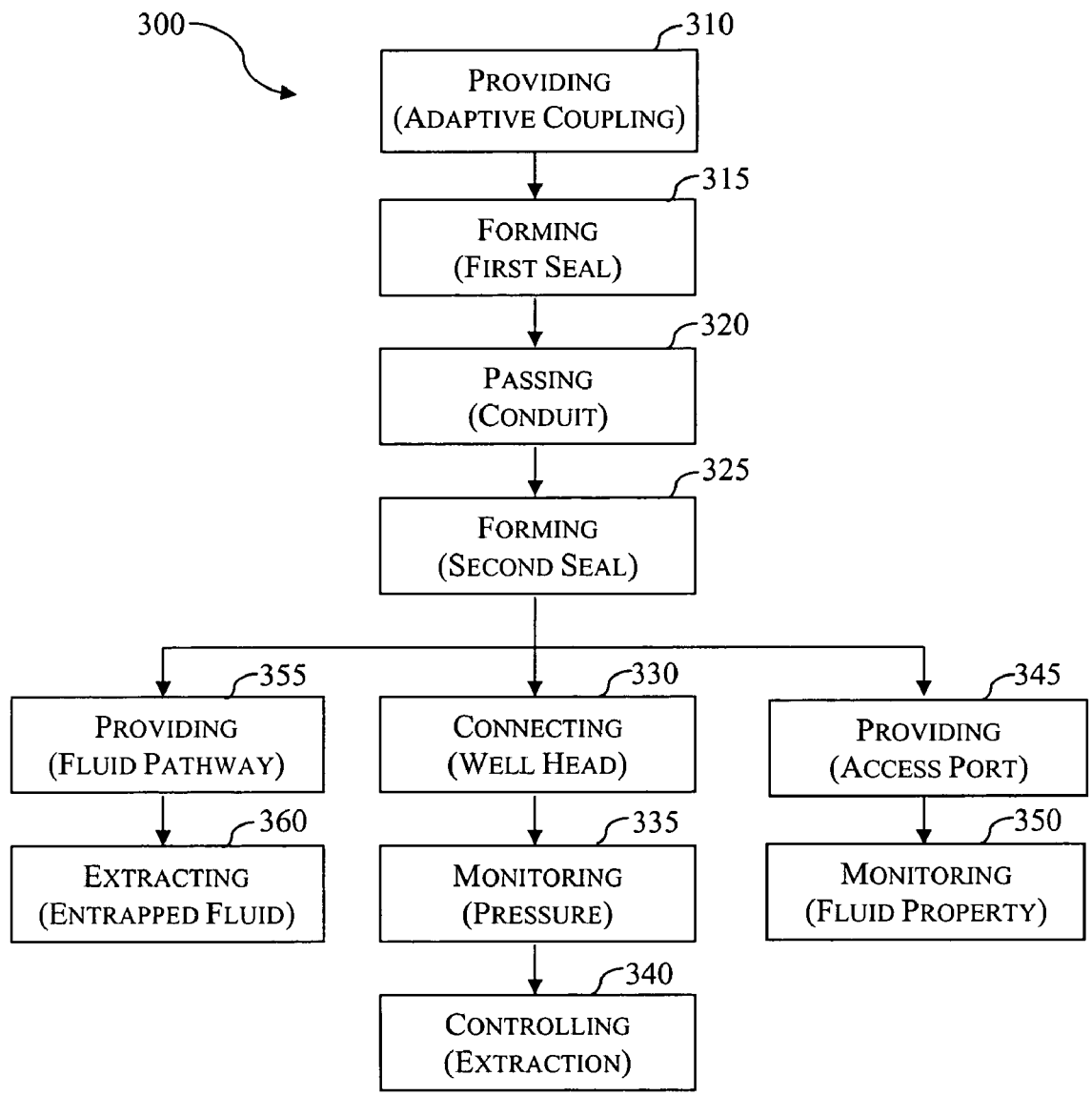
FIG. 5 is a schematic diagram of another preferred method for adaptively coupling the conduit of FIG. 1 to the barrier sheet of FIG. 1 and monitoring and controlling the extraction of a fluid from the landfill, in accordance with the present invention.

Referring to FIG. 5, another preferred embodiment of the present invention is a method, hereafter referred to as the "adaptive method" 300, for monitoring and controlling the extraction of fluid by a fluid collection system (not shown) from a landfill having a barrier sheet and a fluid well with a bore. The steps comprising the adaptive method 300 are discussed below with reference to the landfill example and the adaptive coupling 10 shown in FIGS. 1-2. However, the example is not intended to be limiting. The adaptive coupling method 300 may be practiced in any application in which a geosynthetic membrane covering potentially subsiding material is joined to a conduit passing through the membrane.

The providing an adaptive coupling step 310 provides an embodiment of the present invention such as the adaptive coupling 10 having a tubular member 22 having a first end 26 and a second end 28 and an extendible boot 24 having a first end 34 and a second end 36. The providing step 310 further comprises sealably joining the first end 34 of the extendible boot 24 to the second end 28 of the tubular member 22 such that the first end 34 of the extensible boot 24 is movable in unison with the tubular member 22.

In the forming the first seal step 315, a substantially leakless first seal 102 is formed by joining the first end 26 of the tubular member 22 to the barrier sheet 14 in any of the manners discussed above.

In the passing step 320, the conduit 12 is passed through the entirety of the adaptive coupling 10 and through the barrier sheet 14 such that the barrier sheet 14 is movable axially relative to the conduit 12, the first end (or lower portion) 12*a* of the conduit 12 is in the bore 42 of the fluid well 20 in the landfill 18, and the second end (or upper portion) 12*b* of the conduit 12 accessibly extends from the adaptive coupling 10.

In the forming the second seal step 325, a substantially leakless repositionable second seal 104 is formed by joining the second end 36 of the extensible boot 24 of the adaptive coupling 10 to the conduit 12 such that the first end 34 of the extensible boot 24 is movable axially relative to the second end 36 of the extensible boot 24 when the tubular member 22 moves axially. The second seal 104 is formed in any of the manners discussed above and for brevity not repeated.

In the connecting step 330, the second end (or upper portion) 12*b* of the conduit 12 is connected to the feed pipe 66 of the fluid collection system by the well head 44. The connection may be achieved by inserting the riser 50 of the well head 44 in the conduit upper portion 12*b* and sealably joining the riser 50 to the conduit 12 by a compression coupler 40 allowing adjustment in the length of the riser 50 extending above the upper portion 12*b* of the conduit 12 to achieve alignment of the manifold piping 52 of the well head 44 with the feed pipe 66 of the fluid collection system and connecting the manifold piping 52 to the feed pipe 66.

In the monitoring step 335, the pressure of the fluid in the landfill is monitored based on a radial displacement of the extensible boot by visually observing the shape of the extensible boot 24, a displacement of the extensible boot radially outwardly corresponding to a positive pressure under the landfill cap and a displacement of the extensible boot 24 radially inwardly corresponding to a negative pressure under the landfill cap, as shown in phantom in FIG. 2.

As an alternative to visually monitoring the shape of the extensible boot 24 to determine the pressure under the landfill cap, the adaptive method 300 may further comprise a providing an access port step 345 and a monitoring a property step 350. The providing an access port step 345 provides in the adaptive coupling 10 an access port 4*b**a* in fluid communication with the annular space 48 between the tubular member 22 and the conduit 12. The access port 46*b* formed in substantially the same as discussed above. The monitoring a property step 350 provides for monitoring a property of a fluid in the landfill using the access port 46*b*. If the fluid being monitored is a gas and the property of interest is pressure, the monitoring step 350 provides for connecting a pressure gauge to the access port 46*b*. In addition to monitoring pressure, the access port may be used to monitor other fluid properties. For example, a chromatograph may be connected to the access port 46*b* to determine the composition of the fluid.

In the controlling extraction step 340, the extraction of the fluid from the landfill may be controlled by adjusting a vacuum in the well head 44 caused by the fluid collection system. Preferably, the bleed valves 56 in the manifold pipes 52 of the well head 44 are used to regulate the vacuum in the manifold pipes 52, and therefore also in the conduit 12, to pump the fluid from the gas recovery well 20.

In addition to the fluid in the gas recovery well 20, gas may be entrapped by the barrier sheet 14. To allow recover of the entrapped gas, the adaptive method 300 may further comprising a providing a fluid pathway step 355 and an extracting step 360. The providing a fluid pathway step 355 provides a fluid pathway 62 between the well head 44 and an access port 46*b* in fluid communication with the annular space 48 between the tubular member 22 and the conduit 12. The annular space 48, in turn, is in fluid communication with the entrapped gas. The extracting step 360 provides for using the fluid communication passage 62 and the vacuum in the well head 44 to pump the entrapped gas beneath the barrier sheet 14 through the fluid communication passage 62 and into the well head 44 for recovery by the gas collection system.

Those skilled in the art will appreciate that changes could be made to the embodiments described above without departing from the broad inventive concept thereof. Therefore, the adaptive coupling and method are not limited to the particular embodiments disclosed, but it is intended to cover modifications within the spirit and scope of the present invention as defined by the appended claims.

I claim:

1. An adaptive coupling for joining a conduit to a barrier sheet through which the conduit passes, the barrier sheet movable axially relative to the conduit, the adaptive coupling comprising:
   a tubular member configured to allow passage of the conduit through an entirety of the tubular member, the tubular member having a first end and a second end, the first end having a base configured to sealably join the tubular member to the sheet;
   an extensible boot configured to allow passage of the conduit through an entirety of the extensible boot, the extensible boot having a first end and a second end, the first end sealedly joined to the second end of the tubular member such that the first end of the extensible boot is movable in unison with the tubular member, the second end sealably and fixably joinable to the conduit such that the first end of the extensible boot is movable axially relative to the second end of the extensible boot when the second end of the extensible boot is sealedly and fixedly joined to the conduit and the tubular member moves axially; and
   an access port,
   wherein a substantially leakless seal is formed between the barrier sheet and the conduit when the base of the tubular member is sealedly joined to the sheet and the second end of the extensible boot is sealedly and fixedly joined to the conduit.

2. The adaptive coupling according to claim 1, wherein the access port is part of the tubular member.

3. An adaptive coupling for joining a conduit to a barrier sheet through which the conduit passes, the barrier sheet movable axially relative to the conduit, the adaptive coupling comprising:
   a tubular member configured to allow passage of the conduit through an entirety of the tubular member, the tubular member having a first end and a second end, the first end having a base configured to sealably join the tubular member to the sheet; and
   an extensible boot configured to allow passage of the conduit through an entirety of the extensible boot, the extensible boot having a first end and a second end, the first end sealedly joined to the second end of the tubular member such that the first end of the extensible boot is movable in unison with the tubular member, the second end sealably and fixably joinable to the conduit such that the first end of the extensible boot is movable axially relative to the second end of the extensible boot when the second end of the extensible boot is sealedly and fixedly joined to the conduit and the tubular member moves axially, wherein the base of the tubular member sealedly joins the tubular member to the sheet, a first portion of the conduit passes through the entirety of the tubular member, a second portion of the conduit passes through the entirety of the expansible boot, the second end of the extensible boot is sealedly and fixedly joined to the conduit, and the tubular member has an access port in fluid communication with an annular space between the tubular member and the conduit, and wherein a substantially leakless seal is formed between the barrier sheet and the conduit.

4. The adaptive coupling according to claim 3, wherein the access port is configured to operatively couple to an analyzer for monitoring a property of a gas in the annular space.

5. The adaptive coupling according to claim 3, wherein the access port is configured to enable extraction of a gas in the annular space.

6. An adaptive coupling for joining a conduit to a barrier sheet through which the conduit passes, the barrier sheet movable axially relative to the conduit, the adaptive coupling comprising:
   a tubular member configured to allow passage of the conduit through an entirety of the tubular member, the tubular member having a first end and a second end, the first end having a base configured to sealably join the tubular member to the sheet; and
   an extensible boot configured to allow passage of the conduit through an entirety of the extensible boot, the extensible boot having a first end and a second end, the first end sealedly joined to the second end of the tubular member such that the first end of the extensible boot is movable in unison with the tubular member, the second end sealably and fixably joinable to the conduit such that the first end of the extensible boot is movable axially relative to the second end of the extensible boot when the second end of the extensible boot is sealedly and fixedly joined to the conduit and the tubular member moves axially,
   wherein the barrier sheet is a cap liner of a land fill,
   wherein the base of the tubular member sealedly joins the tubular member to the sheet, a first portion of the conduit passes through the entirety of the tubular member, a second portion of the conduit passes through the entirety of the expansible boot, and the second end of the extensible boot is sealedly and fixedly joined to the conduit,
   wherein the conduit has an upper portion in fluid communication with a well head and the tubular member has an access port in fluid communication with an annular space between the tubular member and the conduit and with the well head, and
   wherein a substantially leakless seal is formed between the barrier sheet and the conduit and the barrier sheet is a cap liner of a landfill.

7. A method for monitoring a pressure of a gas under a cap liner of a landfill, the method comprising the steps of:
   providing an adaptive coupling for joining a conduit to the cap liner through which the conduit passes, the cap liner movable axially relative to the conduit, the adaptive coupling comprising:
      a tubular member configured to allow passage of the conduit through an entirety of the tubular member, the tubular member having a first end and a second end, the first end having a base configured to sealably join the tubular member to the cap liner; and
      an extensible boot configured to allow passage of the conduit through an entirety of the extensible boot, the extensible boot having a first end and a second end, the first end sealedly joined to the second end of the tubular member such that the first end of the extensible boot is movable in unison with the tubular member, the second end sealably and fixably joinable to the conduit such that the first end of the extensible boot is movable axially relative to the second end of the extensible boot when the second end of the extensible boot is sealedly and fixedly joined to the conduit and the tubular member moves axially,
      wherein a substantially leakless seal is formed between the cap liner and the conduit when the base of the tubular member is sealedly joined to the cap liner and the second end of the extensible boot is sealedly and fixedly joined to the conduit, and the extensible boot is displaceable radially without axial extension in response to a change in the pressure of the gas under the cap liner, and
   forming a substantially leakless first seal by joining the base of the tubular member of the adaptive coupling to the cap liner;
   passing a conduit through the entirety of the adaptive coupling and through the cap liner such that the cap liner is movable axially relative to the conduit;
   forming a substantially leakless second seal by joining the second end of the extensible boot of the adaptive coupling to the conduit; and
   monitoring a change in the pressure of the gas based on a radial displacement of the extensible boot.

8. A method for controlling a pressure of a gas under a cap liner of a landfill, the method comprising the steps of:
   providing an adaptive coupling for joining a conduit to a cap liner through which the conduit passes, the cap liner movable axially relative to the conduit, the adaptive coupling comprising:
      a tubular member configured to allow passage of the conduit through an entirety of the tubular member, the tubular member having a first end and a second end, the first end having a base configured to sealably join the tubular member to the cap liner; and
      an extensible boot configured to allow passage of the conduit through an entirety of the extensible boot, the extensible boot having a first end and a second end, the first end sealedly joined to the second end of the tubular member such that the first end of the extensible boot is movable in unison with the tubular member, the second end sealably and fixably joinable to the conduit such that the first end of the extensible boot is movable axially relative to the second end of the extensible boot when the second end of the extensible boot is sealedly and fixedly joined to the conduit and the tubular member moves axially,
      wherein a substantially leakless seal is formed between the cap liner and the conduit when the base of the tubular member is sealedly joined to the cap liner and the second end of the extensible boot is sealedly and fixedly joined to the conduit, and forming a substantially leakless first seal by joining the base of the tubular member of the adaptive coupling to the cap liner;

passing a conduit through the entirety of the adaptive coupling and through the cap liner such that the cap liner is movable axially relative to the conduit;

forming a substantially leakless second seal by joining the second end of the extensible boot of the adaptive coupling to the conduit; and providing in the adaptive coupling an access port in fluid communication with the gas under the cap liner; and reducing the pressure of the gas by extracting the gas using the access port.

9. An adaptive method for monitoring and controlling the extraction of fluid by a fluid collection system from a landfill having a barrier sheet and a fluid well with a bore, the method comprising the steps of:

providing an adaptive coupling having a tubular member and an extensible boot, the tubular member having a first end and a second end, the extensible boot having a first end and a second end, the first end of the extendible boot sealably joined to the second end of the tubular member such that the first end of the extensible boot is movable in unison with the tubular member and the extensible boot is displaceable radially without axial extension in response to a change in a pressure of the fluid under the barrier sheet;

forming a substantially leakless first seal by joining the first end of the tubular member to the barrier sheet;

passing a conduit through the entirety of the adaptive coupling and through the barrier sheet such that the barrier sheet is movable axially relative to the conduit, a first end of the conduit is in the bore of the fluid well in the landfill, and the second end of the conduit accessibly extends from the adaptive coupling;

forming a substantially leakless repositionable second seal by fixedly repositionably joining the second end of the extensible boot of the adaptive coupling to the conduit such that the first end of the extensible boot is movable axially relative to the second end of the extensible boot when the tubular member moves axially;

connecting by a well head the second end of the conduit to the fluid collection system;

monitoring a pressure of the fluid in the landfill based on a radial displacement of the extensible boot; and controlling extraction of the fluid from the landfill by adjusting a vacuum in the well head caused by the fluid collection system.

10. The method according to claim 9, wherein the fluid comprises a gas entrapped by the barrier sheet and the method further comprising the steps of:

providing a fluid pathway between the well head and an access port in the tubular member in fluid communication with an annular space between the tubular member and the conduit; and extracting the entrapped gas using the fluid pathway.

11. The method according to claim 9, wherein the fluid comprises a gas entrapped by the barrier sheet and the method further comprising the steps of:

providing in the adaptive coupling an access port in fluid communication with an annular space between the tubular member and the conduit; and monitoring a property of the entrapped gas using the access port.

12. A method for monitoring a pressure of a gas under a barrier sheet of a landfill, the method comprising the steps of:

forming with an adaptive coupling a substantially leakless seal between a conduit and the barrier sheet through which the conduit passes, the barrier sheet movable axially relative to the conduit, the adaptive coupling comprising an extensible boot configured to extend axially along the conduit in response to subsidence in the landfill, the extensible boot expandable radially without axial extension in response to an increase in the pressure of the gas under the barrier sheet, and monitoring a change in the pressure of the gas based on a radial displacement of the extensible boot.

* * * * *